United States Patent [19]

Balter

[11] Patent Number: 4,621,790

[45] Date of Patent: Nov. 11, 1986

[54] BUTTERFLY VALVE

[75] Inventor: Valentin Balter, San Francisco, Calif.

[73] Assignee: Huntington Mechanical Laboratories, Inc., Mountain View, Calif.

[21] Appl. No.: 614,495

[22] Filed: May 29, 1984

[51] Int. Cl.[4] .............................................. F16K 1/22

[52] U.S. Cl. .................................. 251/305; 137/315; 29/157.1 R

[58] Field of Search ............... 251/305, 306, 308, 356; 137/15, 315; 29/157.1 R, 157.1 A

[56] References Cited

U.S. PATENT DOCUMENTS

| | | | |
|---|---|---|---|
| 3,143,333 | 8/1964 | Lift | 251/305 X |
| 3,862,740 | 1/1975 | Gallagher et al. | 251/305 |
| 3,918,264 | 11/1975 | Bradshaw | 251/305 X |
| 4,146,048 | 3/1979 | McCabe | 29/157.1 R X |
| 4,213,477 | 7/1980 | Velasquez | 251/305 X |

*Primary Examiner*—A. Michael Chambers

*Assistant Examiner*—John C. Fox

*Attorney, Agent, or Firm*—Townsend and Townsend

[57] ABSTRACT

A butterfly valve having a body provided with a fluid passage therethrough. The fluid passage includes a tapered inner surface. A circular valve member is in the housing across the passage and is secured to a shaft rotatable on the housing. One end of the shaft is in a portion of an annular groove in the tapered inner surface, and the other end of the shaft is rotatably mounted in a radial hole by a bearing and projects outwardly from the housing. A knob is on the outer end of the shaft for manual rotation of the shaft. The groove is formed in the body by turning the body on a lathe, thereby requiring only a single hole to be drilled in the body, namely, the hole for receiving the bearing and the adjacent portion of the shaft. Provision of the annular groove eliminates the need for drilling a pair of radial holes on opposite sides of the passage, thereby avoiding misalignment of the shaft.

13 Claims, 4 Drawing Figures

30 28 10 22 12 24 26 34 20

BUTTERFLY VALVE

BACKGROUND OF THE INVENTION

1. Field of the Invention

This invention relates to improvements in fluid valves, especially butterfly valves which have valve members secured to a rotatable shaft and extend across a tapered fluid passage through a valve housing.

2. Description of the Prior Art

A butterfly valve typically has a valve housing provided with a fluid passage therethrough, the fluid passage being circular in cross section and having a tapered surface for engagement by a rotatable, disk-shaped valve member. The valve member is located in the fluid passage so that its resilient O-ring seal, usually on the outer periphery thereof, is movable into sealing engagement with the tapered surface when the valve member is closed, thereby forming a positive seal because the pressure side of the fluid flowing through the passage will be upstream of the largest diameter part of the tapered surface. This pressure causes the valve member to wedge tightly against the tapered surface, thereby enhancing the seal between the valve member and the valve body.

The shaft of a conventional butterfly valve of the type described passes through a first hole on one side of the passage and into a second hole on the opposite side of the passage. These holes must be drilled in one operation by directing a drill radially or diametrically through the valve body to form the first hole, then across the passage and back into the valve body to form the second hole. As the drill enters the drill body to form the second hole, the drill engages the tapered surface of the valve body and, as it does so, the drill has a tendency to drift laterally or axially of the passage toward the larger end of the passage. The hole may, as a result, be inaccurately aligned with the first hole, causing misalignment of the shaft when the shaft is placed in the two holes. This misalignment shifts the shaft laterally and causes the valve member secured to the shaft to be at the wrong location in the valve body with respect to the location at which the valve member properly engages the tapered surface when the valve member is closed. Serious sealing problems arise if the shaft is misaligned. Usually, the valve body must be thrown away or used as scrap because of the misaligned holes.

Because of the aforesaid problem, a need exists for an improved valve body which has no shaft misalignment problem so that the proper sealing action will occur when the valve member is moved to its closed position. The present invention satisfies this need.

SUMMARY OF THE INVENTION

The present invention provides an improved butterfly valve which has a valve body provided with a fluid passage therein defined by a tapered surface extending from one end of the valve body toward the opposite end. The body has an annular groove formed in the tapered surface and a radial hole communicating with the groove. A shaft extends into the hole, across the passage and into the groove portion on the opposite side of the passage from the hole. Bearing means is provided in the hole and coupled with the shaft to permit rotation of the shaft relative to the body itself.

The use of the groove avoids the misalignment problems associated with conventional valves in which two holes are drilled into the valve body on opposite sides of the tapered surface of the passage therethrough. By using the annular groove in combination with the single hole, a shaft can be quickly and easily mounted in place without misalignment of the shaft so that the valve member coupled to the shaft will at all times be in proper location for movement into and out of closing relationship to the tapered surface of the passage across which the shaft extends.

The primary object of the present invention is to provide an improved butterfly valve having a tapered fluid passage therethrough and a curved groove on one side of the passage in alignment with a radial hole through the valve body on the opposite side of the passage, whereby the shaft will be properly positioned at all times relative to the passage to assure that a valve member coupled to the shaft will be properly movable into and out of closing relationship to the fluid passage to thereby avoid the shaft misalignment problems associated with conventional butterfly valves.

Other objects of this invention will become apparent as the following specification progresses, reference being had to the accompanying drawing for an illustration of the invention.

IN THE DRAWING

DETAILED DESCRIPTION OF THE EMBODIMENTS

Figure 4:
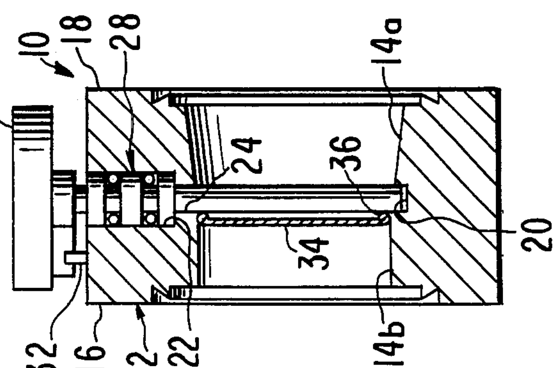
FIG. 4 is a view similar to FIG. 2 but showing the recess and the end of the shaft in the recess.
Figure 3:
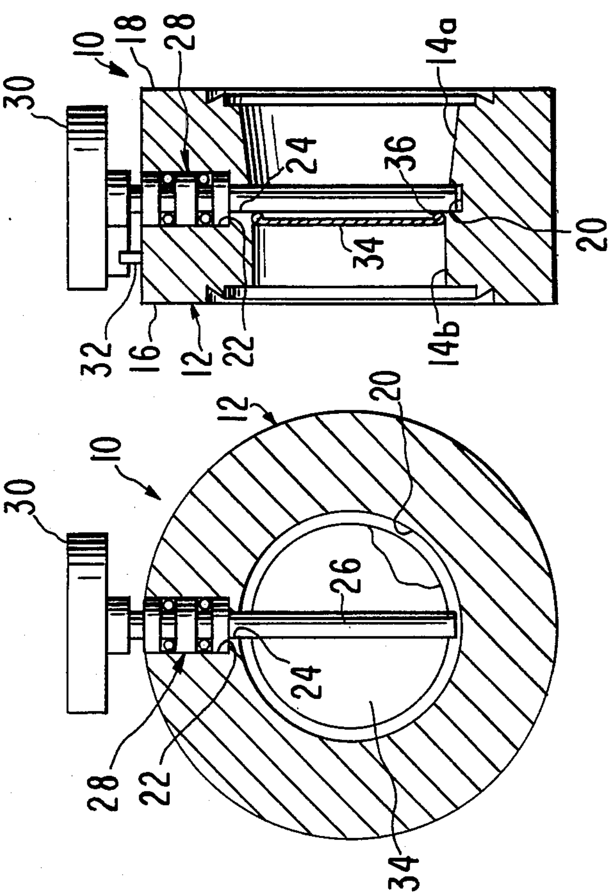
FIG. 3 is a view similar to FIG. 1 but showing an improved valve using an annular groove in place of the single hole for one end of the shaft of the valve.

The valve of the present invention is broadly denoted by the numeral 10 and is illustrated in FIGS. 3 and 4. The valve includes a valve body 12 which, for purposes of illustration, is cylindrical in configuration. The valve has a fluid passage 14 therethrough and is provided with a pair of opposed, generally flat end faces 16 and 18 which can be attached by screws or other fasteners to pipes or other conduits of the fluid system to which valve 10 is to be coupled. Passage 14 includes a tapered inner surface **14*a* and a cylindrical inner surface 14*b*, portions 14*a* and 14*b* being substantially coextensive with each other. The groove 20, as shown in FIG. 4**, is defined by a pair of radial side surfaces and the peripheral outer surface spanning the distance between the radially outer extremities of the side surfaces.

Body 12 has a curved annular groove or recess 20 on the inner peripheral surface thereof near the junction between the surfaces **14*a* and 14*b*. Groove 20 has a slight depth, such as about 10 to 15% of the radial thickness of body 12**.

Body 12 further has a hole 22 therethrough which extends radially of passage 14 as shown in FIG. 4. Hole 22 has a reduced hole portion 24 (FIG. 4) so that a shaft 26 can be inserted into holes 22 and 24 and extend across the passage 14 as shown in FIGS. 3 and 4. As shown in FIG. 4, the outer end of shaft 26 engages at least one of the pair of radial side surfaces defining groove 20. Bearing means 28 is provided in passage 22 and coupled with shaft 26 to permit substantially friction-free rotation of the shaft about its longitudinal axis. The shaft extends outwardly from body 12 and has a knob 30 at its outer end to permit manual rotation of shaft 26 relative to body 12. A suitable stop pin 32 can be provided to limit the arc of rotation of knob 30 and thereby limit the rotation of shaft 26 to a predetermined arc.

A valve member 34 is secured in any suitable manner, such as by fasteners, to one side of shaft 36 as shown in FIG. 4. Valve member 34 has an outer peripheral groove as shown in FIG. 4, and valve member 24 is provided with an O-ring seal 36 in said groove on its outer periphery for sealing engagement with the tapered inner surface 14*a* near the junction with surface 14*b*, Valve member 34 is circular so as to be substantially complemental to the cross section of passage 14 near the junction of surfaces 14*a* and 14*b*. Thus, when valve member 34 is across passage 14 as shown in FIG. 3, the passage is blocked and no fluid flow can pass through passage 14. By rotating shaft 26 in a given direction, valve member 34 can be moved into a position at which passage 14 is partially or substantially fully open so that fluid can flow through the passage.

Figure 2:
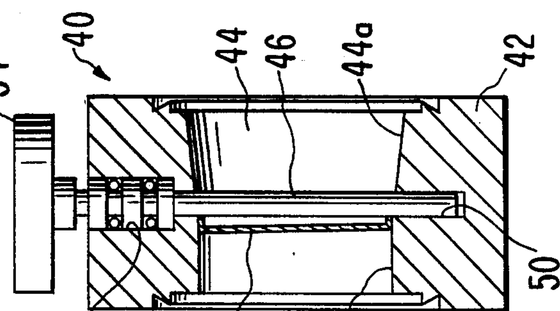
FIG. 2 is a vertical section through the valve, showing the way, slightly exaggerated, in which the shaft of the valve may be misaligned due to the drilling of the hole for the inner end of the shaft.

FIGS. 3 and 4 show that shaft 26 has an outer end which fits readily and easily in groove 20, thus eliminating the need for a drilled hole in the inner peripheral surface of body 12 to receive the adjacent end of the shaft. This drilling would ordinarily take place on the tapered surface as shown in FIG. 2 which shows a prior art butterfly valve 40 similar in construction to valve 10 of FIGS. 3 and 4. Valve 40 has a valve body 42 provided with inner surfaces 44*a* and 44*b* defining a fluid passage 44 through the valve body itself. A shaft 46 extends across passage 44 and has a valve member 48 coupled thereto. One end of the shaft extends into a hole 50 and the other end extends through a second hole 52 and out of valve body 42. The outer end of the shaft 46 is provided with a knob 54 for manually rotating the shaft and thereby valve member 48 relative to valve body 42.

Figure 1:
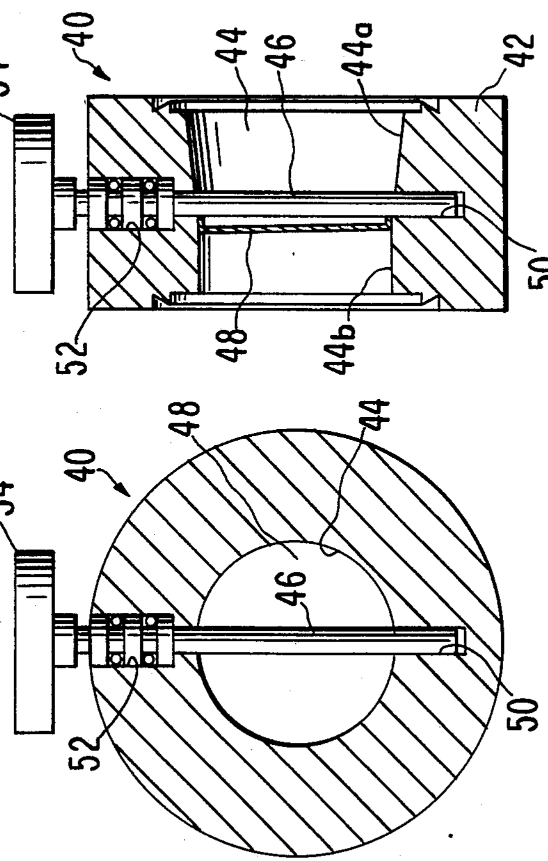
FIG. 1 is a vertical section through a prior art butterfly valve in which the shaft for the valve member of the valve is received within two aligned, drilled holes in the housing for the valve.

Typically, in the formation of the prior art valve body 42 of FIGS. 1 and 2, hole 50 is drilled into body 42 in the same operation in which hole 52 is drilled. However, because hole 50 is drilled into the tapered surface 44*a* of passage 44, it is possible and highly probable that the drill, when entering the tapered surface 44*a*, will drift away, causing hole 50 to be improperly drilled and resulting in misalignment of holes 50 and 52 as shown in FIG. 2. To achieve proper alignment of the holes the use of expensive drill fixtures is required. Unless such drill fixtures are used, misalignment of holes 50 and 52 will improperly locate the shaft 46 and the valve member 48 from desired locations. As a result, valve member 48 will not be properly centered or seated for blocking the flow of fluid through passage 44 when the valve member is closed.

In the case of the improvement shown in FIGS. 3 and 4, only a single hole 24 is first drilled and the hole is enlarged to define hole 22. Since only a single hole 24 is drilled, groove 20 is formed to communicate with the hole 24. This groove is formed on a lathe without changing the setup of the machine. In the closed position of valve member 34, therefore, the valve member centers itself inside body 12, assuring even distribution of the sealing force provided by O-ring 36. Thus, misalignment problems associated with the drilling of two holes as described above with respect to FIGS. 1 and 2 is eliminated, and a more precise valve can be made by using the annular groove 20 formed on the inner peripheral surface of body 12.

I claim:

1. A butterfly valve comprising:

a valve body having a fluid passage therethrough, at least a portion of the passage being defined by a tapered surface;

a hole in the valve body on one side of the passage and communicating with the passage;

a shaft extending through the hole and into the valve body, said valve body having a curved groove extending circumferentially of and into the tapered surface of the passage, said groove being aligned with the hole, one end of the shaft extending into the groove, the circumferential length of the groove being greater than the diameter of the shaft and the axial length of the groove being substantially the same as the diameter of the shaft; and a valve member on the shaft, the opposite end of the shaft extending outwardly from the valve body through said hole, whereby the shaft can be manually rotated to cause the valve member to be moved into and out of closing relationship to the passage.

2. A valve as set forth in claim 1, wherein the groove is annular.

3. A valve as set forth in claim 1, wherein said groove is defined by a pair of radial side surfaces and a peripheral surface spanning the distance between the radially outer extremities of the side surfaces, said one end of the shaft being engagable with at least one of the side surfaces.

4. A valve as set forth in claim 3, wherein said groove is annular.

5. A valve as set forth in claim 1, wherein said passage has a circular cross section, said groove being generally annular, said hole communicating with the groove on said one side of the passage.

6. A valve as set forth in claim 5, wherein the valve member is disc-shaped.

7. A valve as set forth in claim 6, wherein is included an O-ring seal on the outer periphery of the valve member.

8. A valve as set forth in claim 7, wherein said valve member has an outer peripheral groove, said O-ring seal being in the groove.

9. A valve as set forth in claim 1, wherein said housing has a tapered inner peripheral surface and a cylindrical inner surface coextensive with the tapered surface, said groove being in the tapered surface near the junction of the tapered surface and the cylindrical surface.

10. A valve as set forth in claim 9, wherein said groove is annular.

11. A valve as set forth in claim 9, wherein the valve member is mounted on one side of the shaft.

12. A valve as set forth in claim 11, wherein said valve member has an O-ring seal on the outer periphery thereof, said seal engaging the inner surface of the valve body on one side of the groove when the valve member is in a position closing said passage.

13. A butterfly valve comprising:

a valve body having a surface defining a fluid passage therethrough;

a hole in the valve body on one side of the passage and communicating with the passage;

a shaft extending through the hole and into the valve body, said valve body having a curved groove extending circumferentially of and into the surface of the passage, said groove being aligned with the hole, one end of the shaft extending into the groove, the circumferential length of the groove being greater than the diameter of the shaft and the axial length of the groove being substantially the same as the diameter of the shaft; and a valve member on the shaft, the opposite end of the shaft extending outwardly from the valve body through said hole, whereby the shaft can be manually rotated to cause the valve member to be moved into and out of closing relationship to the passage.

* * * * *